United States Patent
Zaghib et al.

(10) Patent No.: US 8,333,911 B2
(45) Date of Patent: Dec. 18, 2012

(54) CO-CRUSHED MIXTURE OF AN ACTIVE MATERIAL AND OF A CONDUCTIVE MATERIAL, PREPARATION METHODS AND USES THEREOF

(75) Inventors: Karim Zaghib, Longueuil (CA); Michel Petitclerc, Notre-Dome-der-Mont-Carmel (CA); Patrick Charest, Sainte-Julie (CA); Abdelbast Guerfi, Brossard (CA); Martin Dontigny, Varennes (CA)

(73) Assignee: Hydro-Quebec, Montreal, Quebec (CA)

( * ) Notice: Subject to any disclaimer, the term of this patent is extended or adjusted under 35 U.S.C. 154(b) by 1089 days.

(21) Appl. No.: 12/162,098

(22) PCT Filed: Jan. 25, 2007

(86) PCT No.: PCT/CA2007/000096
§ 371 (c)(1),
(2), (4) Date: Jul. 24, 2008

(87) PCT Pub. No.: WO2007/085082
PCT Pub. Date: Aug. 2, 2007

(65) Prior Publication Data
US 2009/0087709 A1    Apr. 2, 2009

(30) Foreign Application Priority Data
Jan. 26, 2006  (CA) .................................... 2534276

(51) Int. Cl.
*H01B 1/08*  (2006.01)
*H01B 1/14*  (2006.01)
*H01B 1/18*  (2006.01)
*H01M 4/48*  (2010.01)
*H01M 4/58*  (2010.01)

(52) U.S. Cl. .................... 252/518.1; 525/521.5; 429/232

(58) Field of Classification Search ............... 252/518.1, 252/521.5; 429/209, 232
See application file for complete search history.

(56) References Cited

U.S. PATENT DOCUMENTS 4,686,116 A * 8/1987 Rickborn et al. ............. 427/215
5,521,026 A   5/1996 Brochu et al.
6,190,804 B1  2/2001 Ishiko et al.
(Continued)

FOREIGN PATENT DOCUMENTS

CA    2140456 A1   1/1995
(Continued)

OTHER PUBLICATIONS

International Search Report, dated Mar. 14, 2007.

*Primary Examiner* — Mark Kopec
(74) *Attorney, Agent, or Firm* — Buchanan Ingersoll & Rooney

(57) ABSTRACT

A mixture of particles having a carrier based on at least one active material M1 of average size T1 and of specific surface S1 on which are bonded, via physical and/or chemical bonds, particles of at least an electronically conductive material M2 of average size T2 and of specific surface S2. The mixture is characterized in that: the average size ratio T1/T2 ranges between 5 and 10000; the specific surface ratio S1/S2 ranges between 1/300 and 1/2; and the amount of active material present in the mixture preferably represents more than 80% of the amount of the conductive material. The incorporation of said mixtures into elements constituting electrochemical systems substantially improves the performances of the latter.

15 Claims, 7 Drawing Sheets

U.S. PATENT DOCUMENTS

| | | |
|---|---|---|
| 6,569,557 B1 | 5/2003 | Kitoh et al. |
| 2002/0122985 A1 | 9/2002 | Sato et al. |
| 2005/0058907 A1 | 3/2005 | Kurihara et al. |
| 2005/0234177 A1 | 10/2005 | Kaghib et al. |
| 2005/0250010 A1 | 11/2005 | Kurihara et al. |
| 2005/0285080 A1 | 12/2005 | Suzuki et al. |
| 2010/0233545 A1* | 9/2010 | Sano et al. .................. 429/231.5 |
| 2010/0323098 A1* | 12/2010 | Kosuzu et al. .................. 427/77 |

FOREIGN PATENT DOCUMENTS

| | | |
|---|---|---|
| EP | 1 261 050 A1 | 11/2002 |
| EP | 1 491 501 A1 | 12/2004 |
| WO | WO 03/063287 A2 | 7/2003 |

\* cited by examiner

Agglomerate

Active material
Electronically conductive material

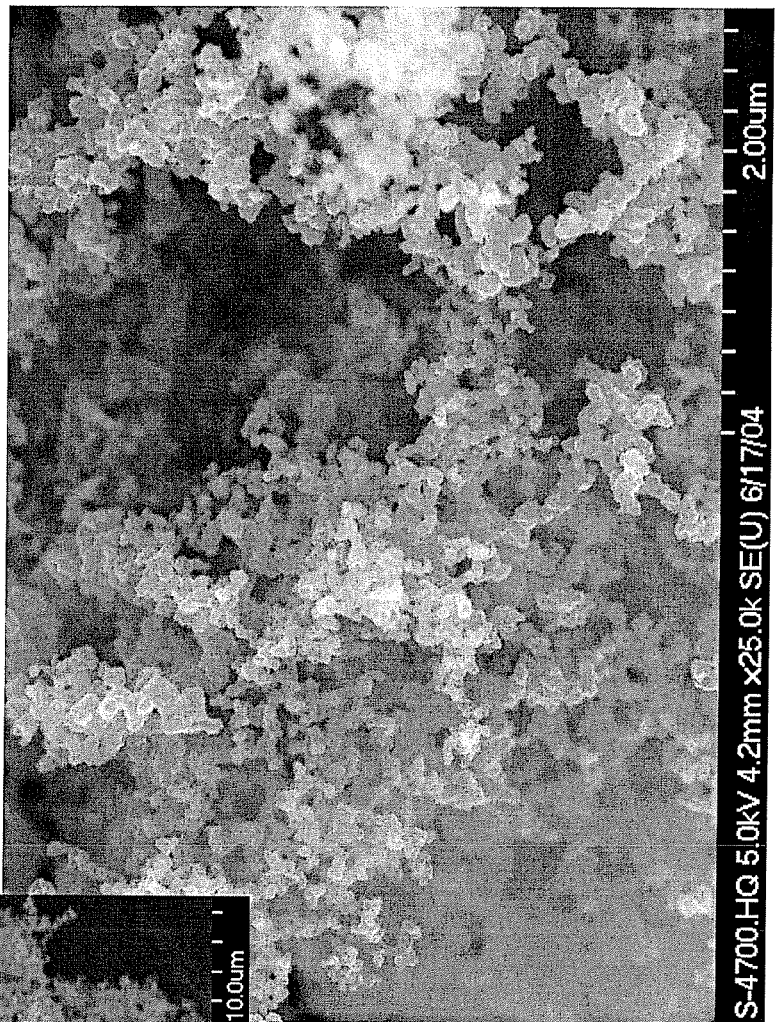
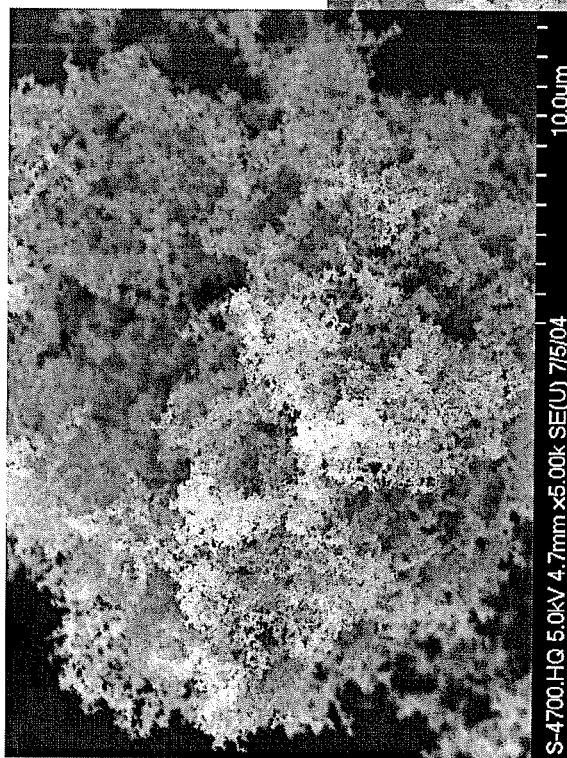
FIG. 3A
FIG. 3B

CO-CRUSHED MIXTURE OF AN ACTIVE MATERIAL AND OF A CONDUCTIVE MATERIAL, PREPARATION METHODS AND USES THEREOF

FIELD OF THE INVENTION

The present invention relates to a mixture of particles consisting of particles of an active material which act as a carrier and to which are attached particles of a conductive material. The particles of the active material, just like those of the conductive material, are chosen in such a way as to have specific surface areas within particular ranges, and in such a way that the ratio (specific surface area of the conductive material/specific surface area of the active material) is itself also within a particular range of values.

The present invention also relates to the polymeric mixtures corresponding to the dissolution of the mixture of particles of the invention in a polymeric matrix.

The present invention also relates to the methods for preparing the mixtures of particles of the invention, in particular by co-grinding particles of an active material and particles of a conductive material, and also those for preparing the polymeric mixtures of the invention.

The present invention also relates to the use of the mixtures of particles and of the polymeric mixtures of the invention, in particular in electrochemical systems.

The present invention also relates to the electrochemical systems integrating at least one mixture of the invention, and more particularly those having a high energy content, as constitutive element.

PRIOR ART

Electroconductive additives are generally used in the preparation of cathodes for lithium polymer and lithium-ion batteries in order to compensate for the low conductivity of the filler material, such as: $LiCoO_2$, $LiMn_2O_4$, $LiNiO_2$, $LiV_3O_8$, $LiV_6O_{13}$, $Li_4Ti_5O_{12}$, $LiFePO_4$, $LiNi_{1/3}CO_{1/3}Mn_{1/3}O_2$, this being in order to allow these materials to have better performance levels. Additives based on a conductive material contribute to increasing the capacity and cyclability and also to reducing the internal resistance of the battery.

The preparation of a liquid-co-ground mixture is described in Hydro-Québec patent CA-A-2,140,456 granted on Jan. 18, 1995. The liquid-co-ground mixture therein is prepared from a pre-co-ground material of a solution containing a high percentage of particles (oxide plus conductive additive having a large specific surface area and a high oil absorption) mixed in a solvent or in a solvent mixture, by means of a ball mill or jar mill, in the presence of steel balls. The co-ground mixture is evaporated and dried at 95° C. for 48 hours under air. The pre-co-ground material thus obtained consists of a dry powder of agglomerated particles. This dried powder is then dispersed in a solution comprising salified or nonsalified polymer. The mixture obtained forms the co-ground mixture for coating. This method is expensive and not environmentally friendly, and in addition, the cathodes prepared contain impurities from the steel balls.

A reproduction of the prior art method revealed, in particular in the preparation of polymer electrodes, that only a small part of the agglomerates present in carbon blacks, used as conductive material, is dispersed during the preparation of the co-grinding mixtures.

There therefore existed a need for a method for preparing mixtures of particles of a conductive material and of particles of an active material, free of the drawbacks of the known methods and resulting in particular in the production of mixtures of these particles having a very low residual agglomerate content.

There also existed a need for new electrodes with an increased capacitance, at equal thickness.

SUMMARY

A first subject of the present invention consists of the mixtures of particles, preferably of particles having a particle size distribution d50 of between 0.1 and 50 μm, even more preferably a d50 of between 1 and 20 μm, said particles consisting of a carrier based on at least one active material $M_1$ of average size $T_1$ and of specific surface area $S_1$, to which are attached, via physical and/or chemical bonds, particles of at least one electronically conductive material $M_2$ of average size $T_2$ and of specific surface area $S_2$.

Each mixture is characterized in that:
- the average size ratio $T_1/T_2$ is between 5 and 10 000, more preferably between 10 and 1000;
- the specific surface area ratio $S_1/S_2$ is between 1/300 and 1/2, more preferably between 1/150 and 1/10; and
- the amount of active material present in the mixture preferably represents more than 80%, even more preferably between 90 and 97%, of the amount of the conductive material.

According to an advantageous embodiment of the invention, the mixtures of particles of the invention can be obtained by co-grinding.

According to another advantageous embodiment, the particles of the active material $M_1$ can be coated with the electronically conductive material $M_2$ over 1% to 50%, preferably over 5% to 20%, of their surface.

Advantageously, the conductive material, which is preferably a carbon, can have at least one of the following characteristics:
- a specific surface area which is less than 200 m²/g;
- a very low nanoporosity, measured according to the TEM (transmission electron microscopy) method;
- an oil absorption, measured according to the "iodine absorption" method, which is less than 200 mg/g, and preferably between 100 mg/g and 20 mg/g; and
- a resistivity of less than 0.2 Ω·cm.

Preferably, the conductive material used has at least one of the following properties:
- a resistivity of between 0.03 and 0.2 Ω·cm;
- the conductive material has a specific surface area which is between 20 and 100 m²/g;
- a degree of fluidity, measured according to the method for measuring the angle of repose and compressibility ("Powder tester", Hosokawa), which is greater than 65, said material preferably being obtained by powder-coating the surface of the particles ($M_1$) with carbon, preferably with carbon chosen from the group consisting of acetylene blacks, in which the conductive material is characterized by a low oil absorption, which is measured according to the ASTM D-2414 method, preferably of less than 400 mg/g, and even more preferably of between 10 and 100 mg/g; and
- the particles of the conductive material that are present constitute a homogeneous mixture characterized by a monodisperse distribution, the peak of which is between 1 nm and 100 nm, preferably the monodistribution peak is between 20 and 80 nm.

Advantageously, the conductive material may be carbon black of Denka Black type.

According to another advantageous embodiment of the invention, the active material may have a specific surface area of greater than 0.1 m$^2$/g; preferably, the specific surface area is between 1 and 10 m$^2$/g.

Preferably, the active material present in the mixture is chosen from the group consisting of:
a) transition metal oxides, preferably those chosen from the group consisting of LiV$_3$O$_8$, LiV$_6$O$_{13}$, V$_6$O$_{13}$, LiV$_2$O$_5$, V$_2$O$_5$, lithiated V$_2$O$_5$, LiMn$_2$O$_4$, and LiCoO$_2$;
b) transition phosphates, preferably those chosen from the group consisting of LiFePO$_4$ and LiMn$_x$Fe$_{(1-x)}$PO$_4$ (x≦1);
c) transition metal silicates, preferably iron silicates, and more preferably those chosen from the group consisting of Li$_2$FeSiO$_4$ and Li$_2$GeSiO$_4$; and
d) a mixture of at least two chemical entities defined in points a) to c) above.

A preferred subfamily of mixtures of the invention may comprise more than one conductive material, and preferably at least one of the conductive materials is chosen from the group consisting of carbon blacks, graphites and carbon fibers, and mixtures of at least two thereof.

A second subject of the present invention consists of the methods for preparing a mixture as defined in the first subject of the present invention, preferably by co-grinding, in a ratio by mass of 1≦M$_2$/M$_1$≦15%:
an active material (M$_1$), having a specific surface area S$_1$; and
an electronically conductive material (M$_2$), having a specific surface area S$_2$ with 1≦S$_2$/S$_1$≦200.

The mixture is homogeneous, with a very low number of agglomerates, the mass of the agglomerates preferably represents less than 20% of the total mass of the mixture, and the particle size ratio T$_2$/T$_1$ ranges between 1 and 0.001.

According to an advantageous embodiment of the invention, the co-grinding can be carried out dry.

Preferably, the co-grinding can be carried out at a temperature between 0 and 60° C., with an energy input which is preferably between 0.1 kWh and 1.5 kWh per kg of powder.

Advantageously, the co-grinding can be carried out in the presence of a gas preferably chosen from the group of inert gases, and in particular from the group consisting of argon and nitrogen, and mixtures thereof.

Preferably, the co-grinding can be carried out for a period of time ranging from 5 to 180 minutes, even more advantageously for a period of between 15 and 90 minutes.

According to a preferred variant, the co-ground material can be prepared in two steps, which are a step of deagglomeration and homogenization of the active material and a step of addition of the electronically conductive material and homogenization of the co-ground mixture.

A third subject of the present application consists of the mixtures of particles that can be obtained by implementing a method as defined in the second subject of the present invention.

A fourth subject of the present invention consists of the use of a mixture of particles as defined in the first subject or as obtained by means of a method as defined in the second subject of the present invention, in the preparation of electrodes in batteries, in particular in liquid cathode batteries, or in paints, or as a coating for magnetic tapes.

A fifth subject of the present invention consists of the polymeric mixtures consisting of at least one mixture of particles as defined in the first subject of the invention or as obtained by implementing a method as defined in the second subject of the invention, said mixture of particles being dispersed in at least one polymer (polymeric matrix), preferably in the form of a polymer solution. The amount of polymer used to prepare the dispersion preferably represents between 50% and 10%, even more preferably from 40% to 15% of the total amount of conductive material(s) and of active material(s) present in the initial mixture.

A preferred subfamily of polymeric mixtures of the invention can be obtained with polymers chosen from the group consisting of 3-branched polymers, more particularly from the group of polymers of P70 type, 4-branched polymers of the Elexcel® type sold by the company DKS-Japan, even more preferably those chosen from the group consisting of polymers of EG type and/or blends thereof, and also from the group of the corresponding salified polymers.

A fifth subject matter of the present invention consists of the methods for preparing one of the polymeric mixtures defined in the fourth subject of the present invention, by:
mixing, preferably obtained by co-grinding,
a filler material (M$_1$) having a specific surface area S$_1$; and
a conductive material (M$_2$), having a specific surface area S$_2$ where 1≦S$_2$/S$_1$≦200, the particle size ratio M$_2$/M$_1$ ranging between 1 and 1000;
said mixture being homogeneous and with very few agglomerates, the percentage by mass of agglomerates preferably representing less than 15%, and more preferably less than 10%, of the total mass of the polymeric mixture, or even no aggregates; and
by dispersing the dispersed co-ground material in a solution of polymer, said polymer solution comprising one or more polymers, preferably 5% to 35%, and also from 65% to 95%, more preferably from 70% to 95%, of a solvent chosen from the group of organic solvents and mixtures of at least two organic solvents, in particular those chosen from the group consisting of nonpolar solvents of aliphatic or cycloaliphatic type, even more preferably acetonitrile and toluene, and mixtures thereof;
or else by dispersing the dispersed co-ground material in a solution of polymer, said polymer solution comprising approximately 50% of one or more polymers and also approximately 50% of a solvent chosen from the group of organic solvents and mixtures of at least two organic solvents, in particular those chosen from the group consisting of nonpolar solvents of aliphatic or cycloaliphatic type, even more preferably acetonitrile and toluene, and mixtures thereof.

According to an advantageous variant, the co-ground mixture can be mixed with a solution of polymer so as to produce a spread-coating mixture having a viscosity of between 0.3 and 3.5 Pa/sec.

A seventh subject of the present invention consists of the polymeric mixtures obtained by implementing a method defined in the fifth subject of the present invention.

An eighth subject of the present invention consists of the use of the polymeric mixture defined in the fifth subject or as obtained by means of the sixth subject of the invention.

Preferably, the polymeric mixture can be used in a liquid battery and/or in a polymer battery, or gel or any polymer, preferably as a material constituting (preferably at least 15% of) the electrode coating, or in paints or as a coating for magnetic tapes.

A ninth subject of the present invention consists of the electrochemical systems, in particular the batteries, which incorporate, into at least one of their constitutive elements, a mixture of particles defined in the first subject of the invention or as obtained by means of a method as defined in the second subject of the invention.

Preferably, the electrochemical system is of liquid battery type.

A tenth subject of the present invention consists of the electrochemical systems, in particular fuel cells, which incorporate, into at least one of their constitutive elements, a polymeric mixture as defined in the fourth subject of the invention or as obtained by means of the fifth subject of the invention.

Preferably, the electrochemical system is of polymer battery type or of ACEP type for a dry polymeric mixture.

An eleventh subject of the present invention consists of the electrodes, preferably the cathodes, comprising at least one mixture as defined in the first subject of the invention and/or at least one polymeric mixture defined in the fourth subject of the present invention, and at least one of the following characteristics:
- reduced number of agglomerates per $cm^2$, preferably reduced by at least 25%, more preferably reduced by at least 50%, relative in particular to the electrodes based on Ketjen black of the prior art;
- a variable capacitance between 1 $mAh/cm^2$ and 10 $mAh/cm^2$;
- a porosity of less than 20%; and
- an ohmic resistance of between 5 and 50 $ohm/cm^2$.

BRIEF DESCRIPTION OF THE DRAWINGS

FIGS. 3A and 3B are scanning electron microscope (SEM) views of the electronically conductive material ($M_1$), Denka carbon, used in examples 2-6.

DETAILED DESCRIPTION OF THE PREFERRED EMBODIMENTS

Figure 1B:
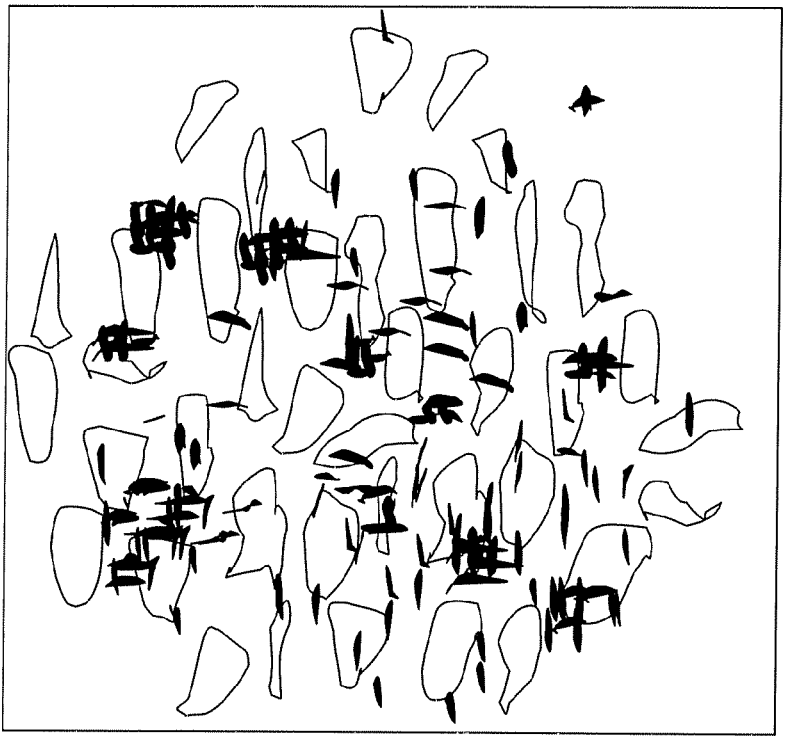
FIGS. 1A and 1B illustrate schematically a co-ground mixture of active material ($M_1$) and of an electronically conductive material ($M_2$) with and without agglomerates, respectively.
Figure 1A:
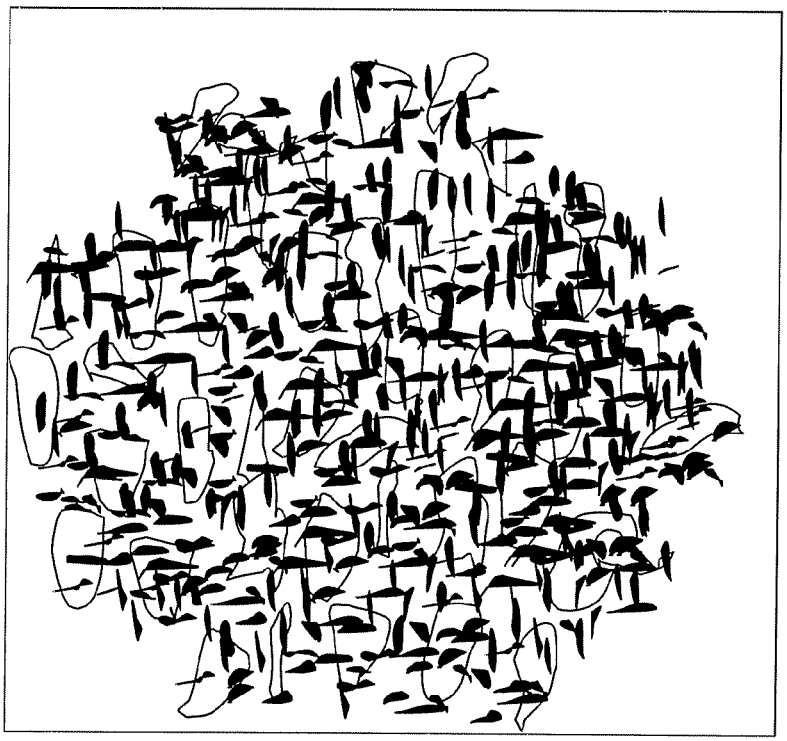
Figure 2B:
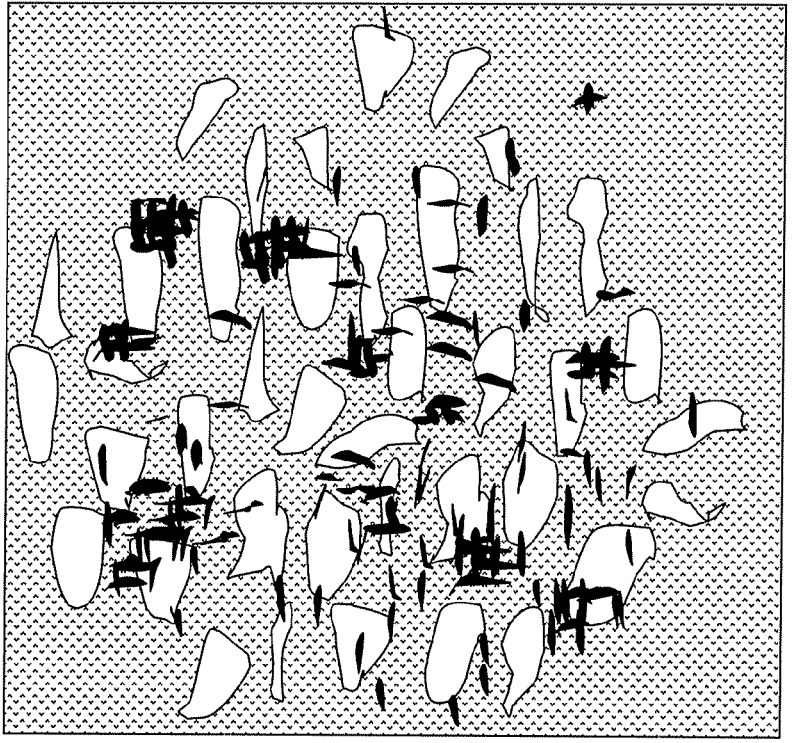
FIGS. 2A and 2B illustrate schematically a scheme for a co-ground mixture of active material ($M_1$) and of an electronically conductive material ($M_2$), dispersed in a polymer solution with and without agglomerates, respectively.
Figure 2B:
Figure 2A:
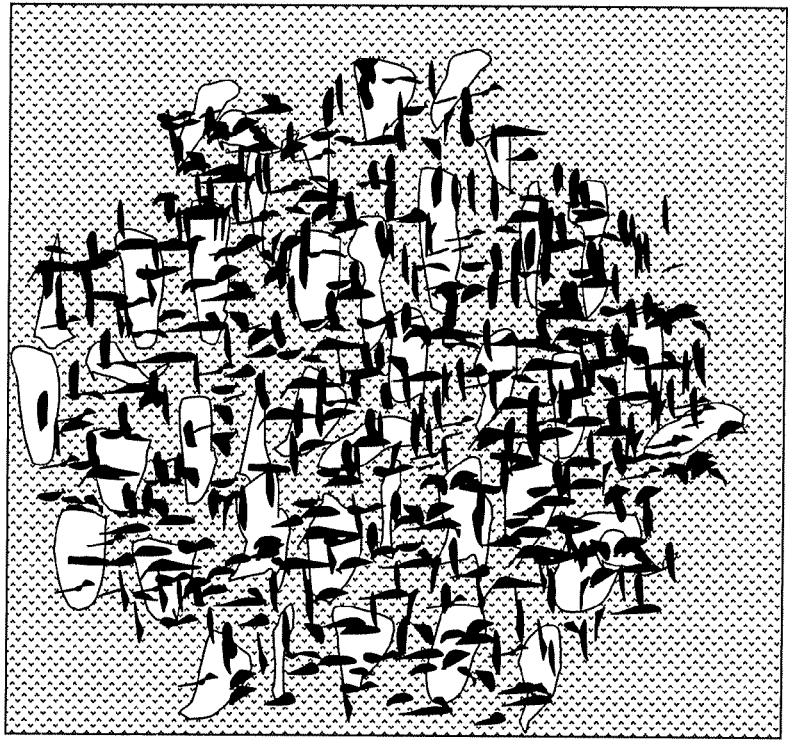
Figure 2A:

In the context of this disclosure, the notion of "homogeneous mixture" serves to describe a mixture of particles of active materials and/or of conductive materials, characterized by a spectrum, obtained by scanning electron microscopy, in which the distribution of the electron species, relative to that of the particles of active material, is produced homogeneously. Such a mixture comprises a minimum content of agglomerates of one or other of the species.

The homogeneity of a mixture of particles of the invention is thus characterized, for the particles of active material which constitute it, by a single-peak dispersion between 0.10 and 20 μm, preferably between 0.5 and 10 μm.

The measurement of the resistance of the mixture dispersed in a binder reflects, for its part, the homogeneity of the mixture (impedance spectroscopy method). In the case of a binder of the type of a polyether polymer with an MW of 70 000 (P70), the resistivity threshold, measured at 25° C., above which the mixture will be considered to be homogeneous is between approximately 5 and 50 $ohm/cm^2$.

In the context of this disclosure, a material that is electrochemically active in a battery, and more particularly electrochemically active in an electrode, is considered to be an "active material".

These materials are preferably chosen from the group consisting of:
a) transition metal oxides, in particular those of the group consisting of $LiV_3O_8$, $LiV_6O_{13}$, $V_6O_{13}$, $LiV_2O_5$, $V_2O_5$, lithiated $V_2O_5$, $LiMn_2O_4$ and $LiCoO_2$, and mixtures of at least two thereof;
b) transition phosphates, in particular those chosen from the group consisting of $LiFePO_4$ and $LiMn_xFe_{(1-x)}PO_4$ with ($x>1$), and mixtures of at least two thereof;
c) transition metal silicates, more preferably those chosen from the group consisting of iron silicates and of mixtures of at least two different iron silicates, and, by way of example, $Li_2FeSiO_4$ and $Li_2GeSiO_4$; and
d) mixtures of at least two of the chemical species defined in a), b) and/or c).

In the context of this disclosure, the active materials advantageously used have a specific surface area, measured according to the BET method, which is between 0.5 and 10 $m^2/g$, even more preferably their specific surface area is between 1 and 3 $m^2/g$.

In the context of this disclosure, as regards a "conductive material", the following criterion for conductivity and/or nonconductivity of a material is used.

The electrical conductivity of a substance, also called ability of a surface to conduct an electric current, is defined as being the inverse of the resistivity: $\sigma=1/\rho$. Since the intensity of the electrical field in the material is expressed by the relationship E=V/L, Ohm's law can be written in terms of current density by the formula $J=\sigma E$. Metals for which $\sigma>10^5$ $(\Omega \cdot m)^{-1}$ are considered to be conductive metals. Materials which correspond to the relationship: $10^{-6}<\sigma<10^5$ $(\Omega \cdot m)^{-1}$ are considered to be semi-conductive materials. Materials corresponding to the relationship $\sigma<10^{-6}$ $(\Omega \cdot m)^{-1}$ are considered to be insulating materials.

In the context of this disclosure, materials, in particular polymers, which have a conductivity of greater than $10^{-5}$ $(\Omega \cdot m)^{-1}$ are classified as conductive materials, in particular as conductive polymers, and materials (in particular polymers) which have a conductivity of less than or equal to $10^{-6}$ $(\Omega \cdot m)^{-1}$ are classified as nonconductive materials (in particular as nonconductive polymers).

In the context of this disclosure, the various reference methods used for measuring the physical parameter referred to as "specific surface area" implement the physical adsorption of a gas at low temperature. These methods are based on the studies by Brunauer, Emmett and Teller, more generally known by the initials BET, dating back to 1938. The calculation of specific surface area is based on the analytical treatment of the adsorption isotherm determined experimentally. It is thus possible to define the amount of gas adsorbed in a complete monolayer, and then to calculate the area of this layer, and therefore the specific surface area of the powder or of the solid.

The equation for the physical adsorption of a gas onto a solid—referred to as BET equation—makes it possible to determine the volume adsorbed in a monolayer: Vm. Once this volume is known, the specific surface area of the sample is obtained by the equation: $S=n \cdot Sm$, in which S represents the total surface area of the sample and n the number of molecules of gas adsorbed in the monolayer. Sm corresponds to the surface area of one molecule of gas.

$$S=[(6 \times 10^{23} \cdot Vm/22214)Sm]/\text{mass of the sample=specific surface area in } m^2/g$$

The specific surface area values for a given molecule of gas are known. The nitrogen molecule is characterized by a specific surface area of 16.2 Å, that of krypton is 20.2 Å and that of argon is 16.6 Å, to mention only the most common. These values are given for a temperature of 77 K.

In the context of this disclosure, the "oil absorption" is measured according to the ASTM D-2414 method. It is the degree to which the particles of the conductive material have fused together to form aggregates.

As used in the context of this disclosure, the expression "3-branched polymers" is related, as illustrated in the document "Relationship between Structural Factor of Gel Electrolyte and Characteristics of Electrolyte and Lithium-ion Polymer Battery Performances", by Hiroe Nakagawa et al., The 44th Symposium in Japan, Nov. 4-6, 2003, abstract 3D26, to polymers comprising three branches in the shape of a 3-branched comb. The 3 substantially parallel branches of these polymers are preferably attached at the center and at the two ends of a small backbone, preferably comprising 3 atoms, preferably 3 carbon atoms, in the chain.

In the case of a 3-carbon-atom chain, each of these atoms is connected to one branch.

Among these 3-branched polymers, and in the context of the present invention, preference is given to those which have an average molecular weight (MW) ranging from 1000 to 1 000 000, even more preferably those for which the average molecular weight ranges from 5000 to 100 000.

As used in the context of this disclosure, the expression "four-branched polymers" is related to international application WO 03/063287 (Hydro-Québec), which is incorporated into the present application by way of reference, and which describes a preferred family of four-branched polymers.

Such polymers have the shape of a 4-branched comb. The 4 substantially parallel branches of these polymers are attached respectively between the two ends (preferably attached symmetrically to the chain) and at the two ends of a small chain, preferably consisting of a chain comprising 4 atoms, which are preferably 4 carbon atoms.

In the case of a 4-carbon-atom chain, each atom is connected to one branch.

Such polymers preferably have hybrid endings, even more preferably acrylate (preferably methacrylate) and alkoxy (preferably alkoxy with from 1 to 8 carbon atoms, even more preferably methoxy or ethoxy), or alternatively vinyl, hybrid endings, at least one branch of said four-branched polymer (and preferably at least two branches) being capable of giving rise to crosslinking.

Preferably, the four-branched polymer is one of those defined in columns 1 and 2 of U.S. Pat. No. 6,190,804 (DKS), which is incorporated into the present application by way of reference.

This polymer is preferably a star polymer of polyether type which has at least four branches having endings containing the following functions: acrylate or methacrylate and alkoxy, allyloxy and/or vinyloxy, in which at least one, and preferably in which at least two, of these functions is (are) active in allowing crosslinking.

Other families of polyethers, the molecular mass of which is greater than or equal to 30 000, are advantageously used in the context of the present invention.

According to another preferred embodiment of the present invention, the 4-branched polymer is a tetrafunctional, preferably high molecular weight, polymer corresponding to formula (I):

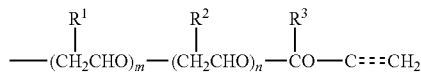

in which $R^1$ and $R^2$ each represent a hydrogen atom or a lower alkyl (preferably from 1 to 7 carbon atoms); $R^3$ represents a hydrogen atom or a methyl group; m and n each represent an integer greater than or equal to 0; in each high molecular weight chain, m+n>35; and each of the groups $R^1$, $R^2$ and $R^3$ and each of the parameters m and n may be identical or different in the 4 high molecular weight chains.

Among these four-branched polymers, those which have an average molecular weight between 1000 and 1 000 000, even more preferably those which have an average molecular weight ranging from 5000 to 100 000, are particularly advantageous.

According to another preferred embodiment, polyethers of star type having at least four branches with a hybrid ending (acrylate or methacrylate and alkoxy, allyloxy, vinyloxy) are selected. It stability voltage is much greater than 4.

In addition, vinyl polymers of EG type, and more particularly those described in patent application EP-A-1249461 (DKS), which is incorporated into the present application by way of reference, are particularly advantageous as protective material. Among these polymers, those of which the average molecular weight ranges from 600 to 2500 are particularly advantageous.

Polymers of this family can advantageously be obtained by reacting ethylene oxide and 1-propanol-2,3-epoxy with the starting material, or by reacting 1-propanol-2,3-epoxy with ethylene glycol as starting material so as to produce a polymer compound. This step is followed by the introduction of polymerizable and/or nonpolymerizable functional groups at each end of a backbone and of the side chains in the resulting polymer compound.

Compounds having one or more active hydrogen residues and alkoxides may also be used as starting materials.

Examples of active hydrogen residues for the compound having one or more active hydrogen residues include the group of hydroxyls, preferably having from 1 to 5 active hydrogen residues. Specific examples of compounds having one or more active hydrogen residues include triethylene glycol monomethyl ether, ethylene glycol, glycerol, diglycerol and pentaerythritol, and derivatives thereof.

Specific examples of alkoxides also include $CH_3ONa$ and t-BuOK, and derivatives thereof.

The polyether polymer compounds of the invention have the structural unit represented by formula (1) and also the structural unit represented by formula (2) and/or the structural unit represented by formula (3) below. The number of structural units represented by formula (1) in one molecule is from 1 to 22 800, more advantageously from 5 to 11 400, and even more advantageously from 10 to 5700. The number of structural units of formula (2) or (3) (but when both are included, this is the total number) is from 1 to 13 600, more advantageously from 5 to 6800, and even more advantageously from 10 to 3400.

Examples of polymerizable functional groups introduced at each molecular end include (meth)acrylate residues, allyl groups and vinyl groups, and examples of nonpolymerizable functional groups include alkyl groups or functional groups comprising boron atoms.

Like the alkyl groups above, alkyl groups containing from 1 to 6 carbon atoms are advantageous, those containing from 1 to 4 carbon atoms are more advantageous, and methyl groups are especially advantageous.

Examples of functional groups comprising boron atoms include those represented by formula (4) or (5) below:

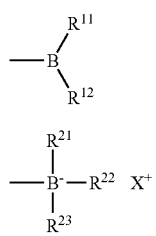

$R^{11}$ and $R^{12}$ in formula (4) and $R^{21}$, $R^{22}$ and $R^{23}$ in formula (5) may be identical or different, and each represents a hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycarbonylamino, ureide, acyl, oxycarbonyl, carbamoyl, sulfonyl, sulfinyl, oxysulfonyl, sulfamoyl, carboxylate, sulfonate, phosphonate, heterocyclic group, —B($R^a$) ($R^b$), —OB($R^a$)($R^b$) or OSi($R^a$)($R^b$)($R^c$). ($R^a$), ($R^b$) and ($R^c$) each represent a hydrogen, halogen, alkyl, alkoxy, aryl, alkenyl, alkynyl, aralkyl, cycloalkyl, cyano, hydroxyl, formyl, aryloxy, alkylthio, arylthio, acyloxy, sulfonyloxy, amino, alkylamino, arylamino, carbonamino, oxysulfonylamino, sulfonamide, oxycarbonylamino, ureide, acyl, oxycarbonyl, carbamoyl, sulfonyl, sulfinyl, oxysulfonyl, sulfamoyl, carboxylate, sulfonate, phosphonate, heterocyclic group, or derivatives thereof. $R^{11}$ and $R^{12}$ in formula (4) and $R^{21}$, $R^{22}$ and $R^{23}$ in formula (5) may be linked together so as to form a ring, and the ring may have substituents. Each group may also be substituted with substitutable groups. In addition, $X^+$ in formula (5) represents an alkali metal ion, and is advantageously a lithium ion.

The ends of the molecular chains in the polyether polymer may all be polymerizable functional groups, or nonpolymerizable functional groups, or may include both.

The average molecular weight (MW) of this type of polyether polymer compound is not especially limited, but it is usually approximately 500 to 2 million, and advantageously approximately 1000 to 1.5 million.

The polymers of these preferred families are, moreover, advantageously chosen from polymers which can be crosslinked by ultraviolet, infrared, heat treatment and/or electron beam ("EBeam").

The purpose of a co-grinding method is realized when the agglomerates, in particular of carbon black, are dissolved and the electronically conductive material is dispersed homogeneously with the active material, and an intimate mixture is thus obtained.

The dispersion is considered to be complete or to be virtually complete when the majority of the agglomerates are separated and wetted, in the case where the medium is liquid.

It appeared to be difficult to homogeneously disperse carbon blacks in a matrix of a second material, owing to the lightness of the material and to its powdery (pulverulent) form.

Contrary to the teaching of the prior art, it was discovered, surprisingly, that a high oil absorption and specific surface area make it very difficult to disperse the particles of the mixture, in particular when carbon blacks are mixed with dense and/or very viscous materials.

It was also discovered that, when carbon blacks are heterogeneously dispersed in the cathode, not only is there a deterioration in the performance levels of the battery, but in addition the rate of production (fabrication of electrodes) is also impaired.

Furthermore, in this type of mixture, the loads of active material and of carbon black must be high, which makes the task of spread-coating uniform electrodes even more laborious.

Good distribution of these particles of carbon black in the mixture for spread coating makes it possible to have good volume conductivity of the cathode.

The present invention relates in particular to new mixtures of particles and to new polymeric mixtures which substantially improve the performances of the electrochemical systems into which they are incorporated.

The present invention relates more particularly to homogeneous mixtures of particles. It has in fact been discovered that it is particularly advantageous, in a mixture of active and conductive particles, for the active material to be as close as possible to the conductive species in order for the path taken by the electrons to involve the maximum number of filler particles of the cathode (FIGS. 1A, 1B and 2A, 2B).

The present invention also relates in particular to a method for preparing a mixture of dry-co-ground particles for the production of electrode films that can be used in ACEP polymer electrolyte accumulators. This method is particularly advantageous from an economical point of view for preparing electrodes.

According to an advantageous embodiment of the present invention, the co-ground material is prepared from a mixture of oxides and of a conductive carbon having a low oil absorption, a low specific surface area and good electron conductivity.

Carbons of this type have been found to have very advantageous properties for preparing solutions of polymers that can be used for coating.

The present invention also makes it possible to solve the problems encountered during the dispersion of particles of carbon black and of oxide in a solution of polymers, ensuring good conduction of the electrode, a low porosity and a good electrochemical performance.

Figure 6:
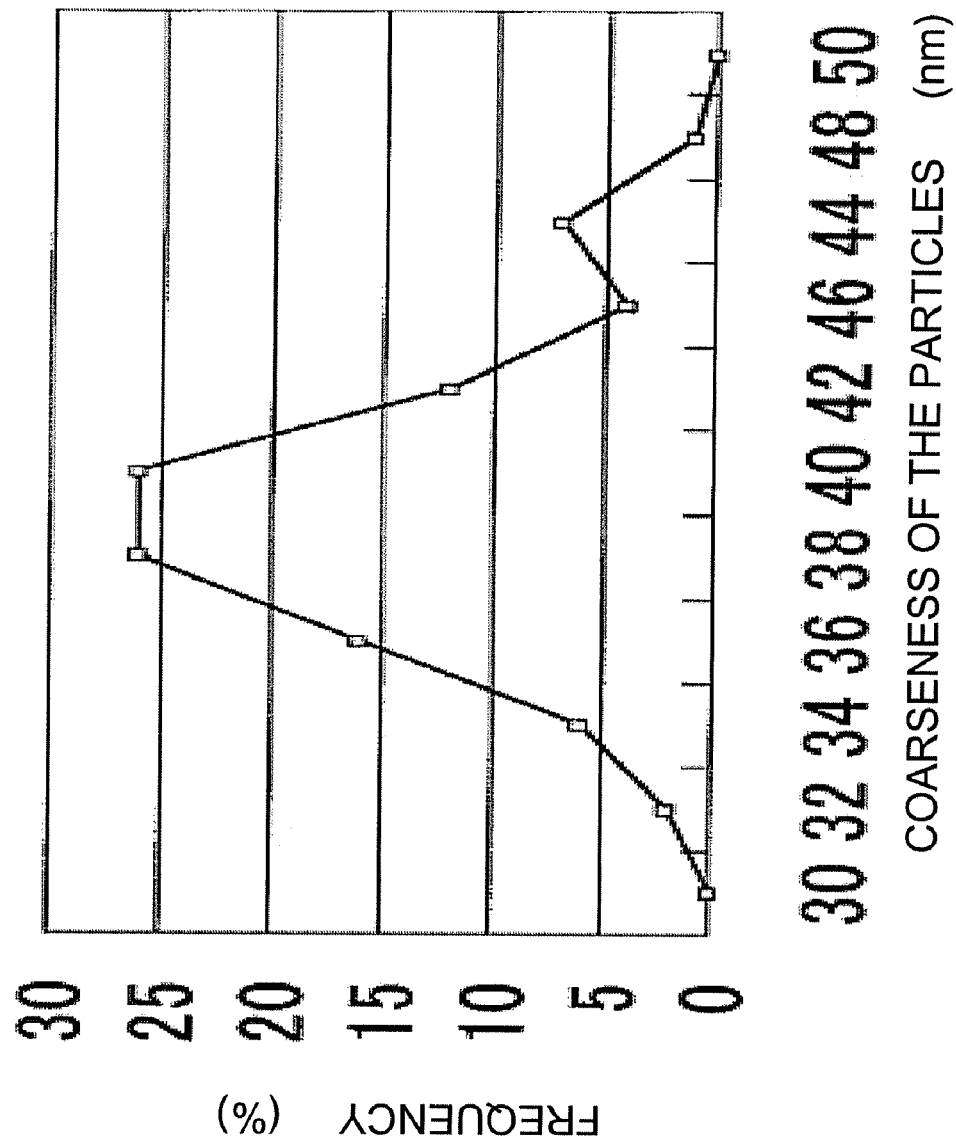
FIG. 6 is a diagram of the particle size distribution of the 100% pressed Denka carbon.

One of the features of the present invention lies in the provision of a method for preparing a mixture co-ground in the presence of a particular electronically conductive additive which proves to be favorable to dispersion in a liquid or dry medium, the features of which are:
 a low oil absorption;
 a low specific surface area; and
 a given monodisperse-particle size (FIG. 6).

It was found, surprisingly, that the use of this type of conductive additive in the preparation of a co-ground material in a polymer solution (FIGS. 2A, 2B) results in a mixture having appropriate rheological properties. The viscosity of the mixture is more controllable, and in addition the amount of the solvent used to prepare the mixture of the co-ground material is reduced and the wettability of the particles of the co-ground material is much improved. Furthermore, the active material/polymer ratio by mass is increased.

One aspect of the present invention lies, according to an advantageous embodiment, in a method for the dry preparation of a co-ground material for coating, based on a mixture of solid particles, preferably of an oxide and of at least one conductive additive. The dry co-grinding makes it possible to reduce the time for preparing the solutions for coating, to reduce the amount of solvent used and to reduce the production cost. The results obtained show that preparing the co-ground material in the presence of the solvent increases the problem of solubility of the oxide. This problem also generates problems of loss of capacity of the battery and limits its calendar life.

The oxide is preferably mixed with the carbon black in a ratio by mass ranging between 85/15 and 97/3, by means of mechanofusion (Hosokawa). The grinding time ranges between 15 minutes and 3 hours. The rotation power depends on the weight of the material to be mixed. The method is advantageously carried out with constant energy. The power should be adjusted according to the weight of the co-ground material. At this power value, the precursors (oxide and carbon black) are mixed homogeneously and break up the agglomerates, without reducing the size of the particles. The temperature in the mixture chamber is controlled between 20 and 30° C. In a second step, the co-ground material obtained is mixed into a solution of a salified or nonsalified polymer. This solution is used to coat cathode/anode films on supports, by the Doctor Blade method.

The dry method is advantageously carried out for coating particles of oxide with the conductive additive, under dry conditions, by mechanofusion. The particles of the oxide and also those of the additive will be deagglomerated by this technique. Next, the light "conductive additive" particles are attached to the surface of the oxide particles by attrition; the combination of the two centrifugal and frictional forces in the particle-particle and particle-chamber wall assemblies makes it possible to obtain intimate solid solutions.

According to an advantageous embodiment of the invention, the conductive additive employed for the use of the co-ground material under dry or liquid conditions is based on a carbon of Denka black type from the company DENKA (Denki Kagaku Kogyo Kabushiki Kaisha, Japan). This carbon may be in a nonpressed or pressed form at various degrees of pressing of 0%, 50%, 75% or 100%.

According to another advantageous embodiment, the conductive additive may be a mixture of Denka black carbon and graphite or a carbon fiber or another electronically conductive material.

This method is particularly advantageous in the preparation of thin films of positive electrodes for the ACEP battery (polymer electrolyte battery).

It has also been identified that the effectiveness of the dry or liquid method lies in the fact that it allows the fine carbon particles to become coated at the surface of the coarse particles, making the co-ground material more wettable and the electron conductivity of the electrode more homogeneous.

Unexpectedly, it has also been discovered, in the context of the present invention, that complete covering of the carrier particles should preferably be avoided; the explanations that can be put forward at this stage of knowledge of the phenomenon are that:

i) as soon as an electron path is created at the surface of the particle of the active material, any amount of the conductive material that is added is in excess; in fact, the degree of covering of the surface of the oxide particles should advantageously not exceed 50%; and ii) it is necessary to ensure sufficient wetting of the particles of the active material with the polymer (binder), which may or may not contain salt, in order to ensure the ion conduction thereof.

Figure 5B:
FIGS. 5A and 5B are views of the surface of the particles of the electronically conductive material, obtained by transmission electron microscopy (TEM).
Figure 5A:

The carbon black advantageously used in the context of the present invention to be attached at the surface of the carrier particles based on an active material does not contain nanopores, as is apparent in FIGS. 5A and 5B, taking into account the scale of measurement by TEM (transmission electron microscopy). This makes it readily dispersible in the polymeric matrix and reduces its solvent absorption capacity. Concretely, when electrodes are prepared using a co-ground mixture of particles of the invention and this type of carbon with a high specific surface area and a low porosity is incorporated, it is necessary to further adjust the concentration of the polymer/solvent. This is done by reducing the amount of solvent.

According to another advantageous embodiment of the present invention, good dispersion of this carbon makes it possible to obtain electrodes with very low porosities (1-5%), which represents an essential parameter in lithium polymer technology, contrary to Li-ion technology, where the porosity should be maintained at around 30% in order for the liquid electrolyte to have access to the particles of active material. Good dispersion of this carbon in the polymer solution makes it possible to have electrodes that are more capacitive, by means of the increase in the oxide/polymer ratio. The cathodes based on co-ground $LiV_3O_8$/carbon black (Denka) and on polymer P70 have capacities which are 12 to 20% higher than those obtained with a mixture of particles co-ground with Ketjen black, without observing a particular specific surface area ratio which was found to be detrimental to the obtaining of low-porosity, more capacitive electrodes.

The comparable cathodes, prepared with Ketjen black according to the techniques of the prior art (CA-A-2,140, 456), exhibit, in addition, a low mechanical strength and are very porous.

According to another advantageous embodiment, it is possible to raise the limiting technological barrier for obtaining a more capacitive cathode by using the 4-branched polymer (preferably of Elexcel® type) in place of the P70. The co-ground $LiV_3O_8$/carbon black (Denka) mixture is then dispersed in a solution of the 4-branched polymer. The high wettability of the 4-branched polymer, the good dispersion of the carbon black (Denka) and also the low solvent absorption make it possible to have electrodes that are more capacitive.

It will be recalled that, for preparing the polymeric mixtures of the invention, use is advantageously made of non-electronically conductive polymers having at least 3 branches, and even more preferably of 4-branched type, such as those described in international application WO 03/063287 (and more particularly on pages 5, 8 and 9), filed in the name of Hydro-Québec, and also in columns 1 and 2 of U.S. Pat. No. 6,190,804, and which have acrylate (preferably methacrylate) and alkoxy (preferably alkoxy containing from 1 to 8 carbon atoms, even more preferably methoxy or ethoxy groups), or else vinyl, hybrid endings.

According to another advantageous embodiment, using a carbon black with a low solvent absorption, in the preparation of electrodes, reduced amounts of solubilized vanadium have been obtained, on the one hand by dry preparation of the co-ground mixture, and on the other hand by reduction of the amount of the solvent.

EXAMPLES

The following examples are given by way of example only, and cannot be considered to represent any limitation of the invention.

Example 1

Co-ground Material with Ketjen Carbon and Polyether Polymer with an MW of 70 000 (P70)

7.2 grams of $LiV_3O_8$ particles having an average size of 2 μm and 0.38 gram of Ketjen carbon particles having an average size of 30 nm are dry-mixed by mechanofusion for 45 minutes. The co-ground $LiV_3O_8$-carbon thus obtained is mixed with 3.25 grams of the polymer P70 and 0.71 gram of LiTFSl particles, to which 29.4 ml of acetonitrile are added; this mixture is introduced into a metal container, ⅓ of the volume of which is taken up with the solution, ⅓ with steel balls 6.34 mm in diameter and ⅓ of the volume is free. The dispersion is obtained by HEBM for 30 minutes at 25° C.

The solution is spread-coated onto an aluminum current collector using the Doctor Blade method. The electrode is vacuum-dried for 24 hours. The electrode obtained has a thickness of 45 micrometers. The cathode contains small balls at its surface, which is a sign of the nonhomogeneity of the cathode. The porosity of the cathode is 30%. The cathode has a capacitance of 5.5 mAh/cm².

Example 2

Co-ground Material with Denka Carbon and Polymer P70

7.2 grams of $LiV_3O_8$ particles having an average size of 2 μm and 0.38 gram of Denka carbon particles having an average size of 35 nm are dry-mixed by mechanofusion for 45 minutes. The co-ground $LiV_3O_8$-carbon thus obtained is mixed with 3.25 grams of polymer P70 and 0.71 gram of LiTFSl, to which 29.4 ml of acetonitrile are added; this mixture is introduced into a metal container, ⅓ of the volume of which is taken up by the solution, ⅓ by steel balls 6.34 mm in diameter and ⅓ of the volume of which is free. The dispersion is obtained by HEBM for 30 minutes at 25° C.

The solution is spread-coated onto an aluminum current collector using the Doctor Blade method. The electrode is vacuum-dried for 24 hours. The electrode obtained has a thickness of 44.5 micrometers. The cathode is smooth and contains no defect, however it is less capacitive, its capacitance is at 2.6 mAh/cm².

This is explained by the fact that the concentration of the co-ground material-polymer solution mixture is too dilute and by the use of this carbon which has a low solvent absorption. The cathode mixture is therefore dilute. An adjustment of the concentration is required.

Example 3

Co-ground Material with Denka Carbon and Graphite 14.15 grams of $LiV_3O_8$ particles having a size of 2 μm, 0.47 gram of Denka carbon particles having a size of 35 nm and 0.47 gram of natural graphite are dry-mixed by mechanofusion for 45 minutes. The co-ground $LiV_3O_8$-carbon-graphite thus obtained is mixed with 5.0 grams of polymer P70 and 1.0 gram of LiTFSl, to which 19.4 ml of acetonitrile are added; this mixture is introduced into a metal container, ⅓ of the volume of which is taken up by the solution, ⅓ by steel balls 6.34 mm in volume, and ⅓ of the volume of which is free. The dispersion is obtained by HEBM for 30 minutes at 25° C.

The solution is spread-coated onto an aluminum current collector using the Doctor Blade method. The electrode is vacuum-dried for 24 hours. The electrode obtained has a thickness of 44 micrometers. The cathode is smooth and contains no defect. It also exhibits a very good capacitance of 5.2 mAh/cm². These results demonstrate the technological advantage obtained in the production of excellent homogeneous thin films, while at the same time reducing the amount of solvent required. The porosity of the cathode is reduced by 87% compared with that obtained in example 1 using the co-ground mixture with Ketjen carbon.

Example 4

Co-ground Material with Denka Carbon and Polymer 4B—Increase in Capacitance of the Cathode 59.2 grams of $LiV_3O_8$ particles having an average size of 2 μm and 3.1 grams of Denka carbon particles having an average size of 35 nm are dry-mixed by mechanofusion for 45 minutes. The co-ground $LiV_3O_8$-carbon thus obtained is mixed with 5.0 grams of polymer 4B and 1.0 gram of LiTFSl particles, to which 19.4 ml of acetonitrile are added; this mixture is introduced into a metal container, ⅓ of the volume of which is taken up by the solution, ⅓ by steel balls 6.34 mm in diameter, and ⅓ of the volume of which is free. The dispersion is obtained by HEBM for 30 minutes at 25° C.

The solution is spread-coated onto an aluminum current collector using the Doctor Blade method. The electrode is vacuum-dried for 24 hours. The electrode obtained has a thickness of 52 micrometers. The cathode is smooth, it contains no defect and it has a very good capacitance, which is 5.6 mAh/cm². The porosity of the cathode is evaluated at 8%. This confirms the technological advantage gained by the production of the excellent, homogeneous, more capacitive cathodes, while at the same time reducing the amount of solvent. The percentage of oxide in the cathode is increased by 18% by virtue of the excellent dispersion of the Denka carbon and the excellent wettability of the polymer 4B (Elexcel® TA 210).

Example 5

Co-ground Material with Denka Carbon and Polymer EG 2500

7.3 grams of $LiV_3O_8$ particles having an average size of 2 μm and 0.375 gram of Denka carbon particles having an average size of 35 nanometers are dry-mixed by mechanofusion for 45 minutes. The co-ground $LiV_3O_8$-carbon thus obtained is mixed with 3.23 grams of polymer EG2500 and 0.70 gram of LiTFSl particles, to which 29.4 ml of acetonitrile are added; this mixture is introduced into a metal container, ⅓ of the volume of which is taken up by the solution, ⅓ by steel balls 6.34 mm in diameter, and ⅓ of the volume of which is free. The dispersion is obtained by HEBM for 30 minutes at 25° C.

The solution is spread-coated onto an aluminum current collector using the Doctor Blade method. The electrode is vacuum-dried for 24 hours. The electrode thus obtained has a thickness of 47.5 micrometers. The cathode is smooth, contains no defect and nevertheless exhibits a good capacitance of 5.35 mAh/cm². The porosity of the cathode is 3%.

Example 6

Co-ground LiFePO$_4$ with Denka Carbon and Polymer 78 grams of LiFePO$_4$ particles having an average size of 2 μm and 0.45 gram of Denka carbon particles having an average size of 35 nm are dry-mixed by mechanofusion for 45 minutes. This co-ground LiFePO$_4$-carbon is mixed with 3.25 grams of polymer 4B (Elexcel® TA210) and 0.9 gram of LiTFSI particles, to which 45 ml of acetonitrile are added; this mixture is introduced into a metal container, ⅓ of the volume of which is filled with the solution of this mixture, ⅓ with steel balls 6.34 mm in diameter, and ⅓ of the volume of which remains free. The coating is obtained by HEBM for 30 minutes at 25° C.

The solution is spread-coated onto an aluminum current collector, using the Doctor Blade method and the LiFePO$_4$-4B electrode is vacuum-dried for 24 hours. The electrode has a thickness of 45 micrometers, with a capacitance of 4.57 mAh/cm². The porosity of the cathode is 7%.

FIGS. 3A and 3B are scanning electron microscope (SEM) views of the electronically conductive material (M$_1$), Denka carbon, used in examples 2-6.

Figure 4B:
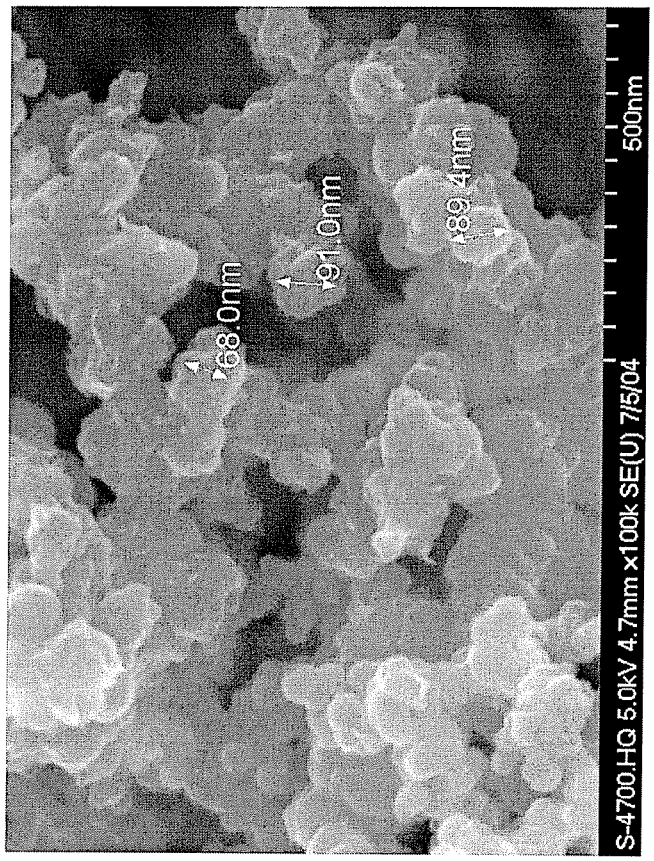
FIGS. 4A and 4B are scanning electron microscope (SEM) views of particles of the electronically conductive material ($M_1$) with particle size determination.
Figure 4A:
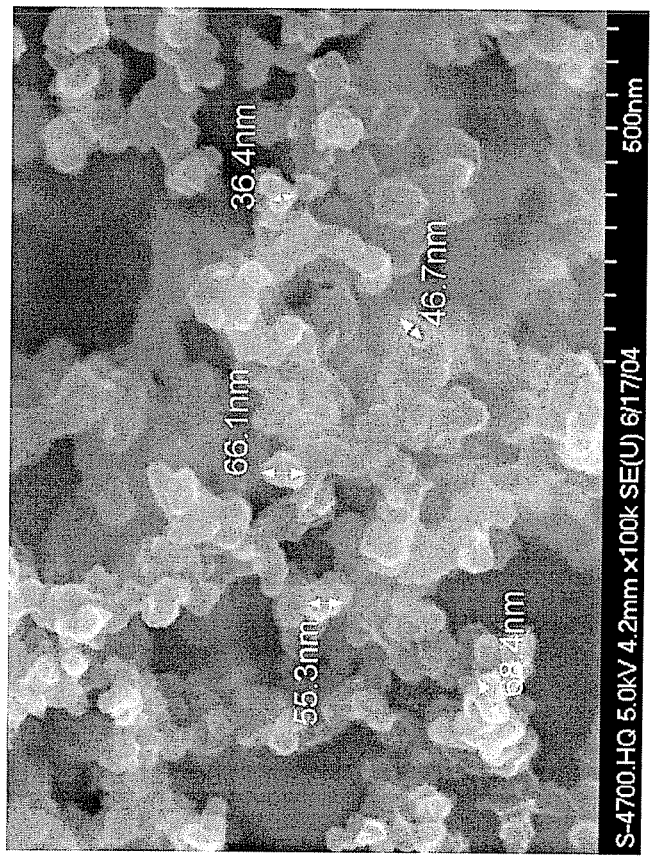

FIGS. 4A and 4B are scanning electron microscope (SEM) views of particles of the electronically conductive material (M$_1$) with particle size determination.

Figure 7:
FIG. 7 is a scanning electron microscope view of a mixture, according to example 2, of a dry-co-ground material of $LiV_3O_8$ with Denka carbon obtained dry by mechanofusion.

FIG. 7 is a scanning electron microscope view of a mixture, according to example 2, of dry-co-ground LiV$_3$O$_8$ with Denka carbon, obtained under dry conditions by mechanofusion.

Conclusively, the preparation of electrodes from mixtures of particles of the invention provides a considerable economic and environmental gain. Thus, by way of example, in the case of the use of a carbon of Denka black type with a degree of pressing of 50-100%, this carbon is chosen from the range of acetylene black products, and the amount of solvent required to prepare pasty coating solutions is reduced by a factor of 15%, compared with a standard conductive carbon of Ketjen type from the company (Akzo Nobel). Furthermore, the costs of recycling the solvents used should be taken into consideration.

On the other hand, when the electrodes are prepared from a co-ground mixture and using Shawinigan black, with acceptable electron conduction, it is necessary to increase the amount of the latter in the mixture of the invention and relative to the active material, to a value at least double the Denka carbon.

Another economic aspect consists in increasing the percentage of the active material in the composition in the electrode up to 20%, which increases the energy content of the polymer battery.

By virtue of the selection of a conductive material, i.e. a carbon black, with particular porosity and specific surface area characteristics, and also by virtue of the selection of polymers of a particular type, i.e. 4-branched polymers, spread-coatings can be carried out with a higher content of active material. The energy content can thus be increased up to 25-30%.

Electrodes of fuel cells require thicker electrodes. The use of the mixtures of particles, in particular those containing carbons having particular characteristics, and of the polymeric mixtures of the invention, in fuel cells, substantially improves the performances and reduces the cost of these electrochemical systems.

Although the present invention has been described by means of specific implementations, it is understood that several variations and modifications may be added on to said implementations, and the present invention aims to cover such modifications, uses or adaptations of the present invention according, in general, to the principles of the invention and including any variation of the present disclosure that will become known or conventional in the field of activity of the present invention, and which can be applied to the essential elements mentioned above.

The invention claimed is:

1. A material comprising a mixture of particles distributed in at least one polymer, wherein:
   a) the mixture of particle is made of particles having a particle size distribution d50 of between 0.1 and 50 μm, said particles being formed of a carrier based on at least one active material M$_1$ of average size T$_1$ and of specific surface area S$_1$, to which are attached, via physical and/or chemical bonds, particles of at least one electronically conductive material M$_2$ of average size T$_2$ and of specific surface area S$_2$, wherein:
   the average size ratio T$_1$/T$_2$ is between 5 and 10,000;
   the specific surface area ratio S$_1$/S$_2$ is between 1/300 and 1/2; and
   the respective amounts of the active material M$_1$ and of the conductive material M$_2$ are such that $1\% \leq M_2/(M_1+M_2) \leq 15\%$;
   b) the amount of polymer represents from 10% to 50% of the total amount of conductive material and of active material,
   wherein the polymer is a 3 branch or 4 branch polyether having structural units represented by formula (1), structural unit represented by formula (2) and/or the structural units represented by formula (3)

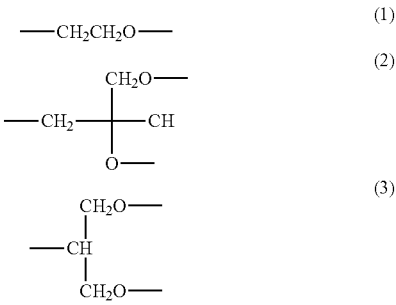

wherein the number of structural units represented by formula (1) is from 1 to 22 800, and the total number of structural units of formula (2) and (3) is from 1 to 13 600,
wherein each branch of the polymer has a crosslinkable end group selected from acrylate and methacrylate groups, or a non crosslinkable end group selected form alkoxy, allyloxy and vinyloxy, and at least one branch has a crosslinkable end group.

2. The material as claimed in claim 1, in which the particles of the active material M$_1$ are coated with the electronically conductive material M$_2$ over 1% to 50% of their surface.

3. The material as claimed in claim 1, in which the conductive material has a resistivity of between 0.03 and 0.2 Ω·cm.

4. The material as claimed in claim 1, in which the conductive material has a specific surface area which is between 20 and 100 m$^2$/g.

5. The material as claimed in claim 1, which is homogeneous and in which the particles of the conductive material that are present constitute a homogeneous mixture, the material comprising a monodisperse distribution, the peak of which is between 1 nm and 100 nm.

6. The material as claimed in claim 1, in which the active material has a specific surface area of greater than 0.1 m$^2$/g.

7. The material as claimed in claim 1, wherein the active material $M_1$ present in the mixture is selected from the group consisting of:
  a) transition metal oxides;
  b) transition phosphates;
  c) transition metal silicates; and
  d) a mixture of at least two chemical entities defined in points a) to c) above.

8. The material as claimed in claim 7, wherein the transition metal oxides are selected from the group consisting of $LiV_3O_8$, $LiV_6O_{13}$, $V_6O_{13}$, $LiV_2O_5$, $V_2O_5$, lithiated $V_2O_5$, $LiMn_2O_4$ and $LiCoO_2$.

9. The material as claimed in claim 7, wherein the transition phosphates are selected from the group consisting of $LiFePO_4$ and $LiMn_xFe_{(1-x)}PO_4$ ($x \leqq 1$).

10. The material as claimed in claim 7, wherein the transition metal silicates are iron silicates selected from the group consisting of $Li_2FeSiO_4$ and $Li_2GeSiO_4$.

11. The material as claimed in claim 1, comprising more than one conductive material, at least one of which is selected from the group consisting of carbon blacks, graphites, carbon fibers, and mixtures of at least two thereof.

12. The material as claimed in claim 1, in which the polymer is a 3-branched polymer or a 4-branched polymer selected from the group consisting of polymers of EG type, blends thereof, and corresponding salified polymers.

13. The material as claimed in claim 1, in which the active material $M_1$ and the conductive material $M_2$ are co-ground together.

14. The material as claimed in claim 1, in which the average size ratio $T_1/T_2$ is between 10 and 1,000.

15. The material as claimed in claim 1, in which the specific surface area ratio $S_1/S_2$ is between 1/150 and 1/10.

* * * * *